(12) United States Patent
Thibaud (10) Patent No.: US 7,840,295 B2
(45) Date of Patent: Nov. 23, 2010

(54) COMPUTER IMPLEMENTED METHOD FOR DEFINING AN INPUT PRODUCT

(75) Inventor: Colas Thibaud, Versailles (FR)

(73) Assignee: Dassault Systemes, Suresnes, Cedex (FR)

( * ) Notice: Subject to any disclaimer, the term of this patent is extended or adjusted under 35 U.S.C. 154(b) by 702 days.

(21) Appl. No.: 11/879,688

(22) Filed: Jul. 18, 2007

(65) Prior Publication Data
US 2008/0021583 A1 Jan. 24, 2008

(30) Foreign Application Priority Data
Jul. 21, 2006 (EP) .................... 06291187

(51) Int. Cl.
*G06F 19/00* (2006.01)
*G06F 17/50* (2006.01)
*G06F 3/048* (2006.01)

(52) U.S. Cl. .................. 700/97; 700/182; 703/1; 715/771

(58) Field of Classification Search ............ 700/97, 700/182; 703/1, 7, 8; 706/919
See application file for complete search history.

(56) References Cited

U.S. PATENT DOCUMENTS

| | | | | |
|---|---|---|---|---|
| 4,945,488 | A * | 7/1990 | Carver et al. | 700/182 |
| 5,023,800 | A * | 6/1991 | Carver et al. | 700/182 |
| 5,434,791 | A * | 7/1995 | Koko et al. | 700/97 |
| 6,272,447 | B1 * | 8/2001 | Gavin et al. | 703/1 |
| 7,092,775 | B2 * | 8/2006 | Nomoto et al. | 700/97 |
| 2007/0271073 | A1 * | 11/2007 | Mifsud et al. | 703/1 |

FOREIGN PATENT DOCUMENTS

| | | | |
|---|---|---|---|
| EP | 1 881 384 A1 | 1/2008 | |
| GB | 2 332 958 A | 7/1999 | |
| GB | 2332958 A | * | 7/1999 |

OTHER PUBLICATIONS

Alexander, S.M., et al., "Computer Aided Process Planning Systems: Current and Future Directions," International Conference on Systems, Man and Cybernetics, *IEEE* 1:462-466 (1983).
Crow, K., "Computer-aided Process Planning," online http:www.npd-solutions.com/capp.html, pp. 1-4, retrieved Feb. 4, 2008.
Gupta, S.K., et al., "Development of a CAPP System for Prismatic Parts Using Feature Based Design Concepts," *Int. J. Adv. Manuf. Technol.* 7:306-313 (1992).
Sarma, S.E., et al., "Rapid Product Realization From Detail Design," *Computer-Aided Design* 28(6):383-392 (1996).

* cited by examiner

*Primary Examiner*—Albert DeCady
*Assistant Examiner*—Sivalingam Sivanesan
(74) *Attorney, Agent, or Firm*—Hamilton, Brook, Smith & Reynolds, P.C.

(57) ABSTRACT

A computer system and implemented method for defining an input product to be manufactured into an output product, comprises steps of:
  (a) receiving an output product having attributes and comprising at least one sub-product, said sub-product having attributes;
  (b) associating to said output product a manufacturing operation identified among a plurality of manufacturing operations;
  (c) defining attributes of said input product, said input product attributes deriving from modification of attributes of the at least one sub-product according to the associated manufacturing operation.

The computer implemented method of the invention thus derives input products from the output product to be manufactured with a process oriented approach. Design modifications on output product can be directly and automatically taken into account in input products.

20 Claims, 10 Drawing Sheets

FIG. 8 stringer_panel joining operation

| Macro Activity: | stringer_panel assembly macro-activity — 59e |
| Name: | stringer_panel joining operation — 63 ☐ Automatic |

| Welds | Added Material | Fit-up | Attachment Lines | Alignment Marks | Reference Lines | Edge Preparations | ◀ ▶ |
|---|---|---|---|---|---|---|---|
| Labels | | | Marked Side | | Marking Side | | |
| profile 1 | | | Molded | 73 | Molded | | |
| profile 2 | | | Molded | | Molded | | |
| Profile 3 | | | Molded | | Molded | | |

FIG. 9 stringer_panel joining operation — 67

| Macro Activity: | stringer_panel assembly macro-activity — 59e |
| Name: | stringer_panel joining operation — 63 ☐ Automatic |

| Welds | Added Material | Fit-up | Attachment Lines | Alignment Marks | Reference Lines | Edge Preparations | ◀ ▶ |
|---|---|---|---|---|---|---|---|
| Neat Product | Stock Product | Sub Type | | Size | | | |
| ...... | plate | Unit Assembly Margin | | 50 mm | | | |

FIG. 10 stringer_panel joining operation — 69

| Macro Activity: | stringer_panel assembly macro-activity — 59e |
| Name: | stringer_panel joining operation — 63 ☐ Automatic |

| Welds | Added Material | Fit-up | Attachment Lines | Alignment Marks | Reference Lines | Edge Preparations | ◀ ▶ |
|---|---|---|---|---|---|---|---|
| Interim Products | E | Interim Products | | Edge prep. | | | |
| plate | | -, profile 1 | | Single_Bevel_with_Shoulder | | | |
| plate | | -, profile 2 | | Single_Bevel_with_Shoulder | | >75 | |
| plate | | -, Profile 3 | | Single_Bevel_with_Shoulder | | | |

COMPUTER IMPLEMENTED METHOD FOR DEFINING AN INPUT PRODUCT

RELATED APPLICATION

This application claims priority under 35 U.S.C. §119 or 365 to European Patent Application No. EP 06291187.0, filed Jul. 21, 2006.

The entire teachings of the above application are incorporated herein by reference.

FIELD OF THE INVENTION

The invention relates to the field of computer programs and systems, and more specifically to a computer implemented method for defining specifications of an input product to be manufactured into an output product according to its manufacturing process.

BACKGROUND OF THE INVENTION

Computer-aided techniques include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing operations.

A number of systems and programs are offered on the market for the design of parts or assemblies of parts, forming a product, such as the one provided by Dassault Systemes under the trademark CATIA. These CAD systems allow a user to design and manipulate complex 3D models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are essentially specifications of geometry. Specifically, CAD files contain specifications, from which geometry is generated, which in turn allow for a representation to be generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. For instance, the typical size of a ship section manufacturing assembly is 3000 parts; each parts is 0.1 to 0.2 Mb; a ship is made of hundreds of sections. A CAD system manages models of objects, which are stored in electronic files. In computer-aided techniques, the graphical user interface (GUI) plays an important role as regards the efficiency of the technique.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, OEM, and customers), PLM may allow this network to operate as a single entity to conceptualize, design, build, and support products.

Some PLM solutions make it for instance possible to design and develop products by creating digital mockups (a 3D graphical model of a product). For instance, the digital product may be first defined and simulated using an appropriate application. Then, the lean digital manufacturing processes may be defined.

The PLM solution provided by Dassault Systemes (for example under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes and resources to enable dynamic, knowledge-based product creation and decision support that drives optimized product definition, manufacturing preparation, production and service. Such PLM solutions comprise a relational database of products. The database comprises a set of geometrical data, textual data and relations between the data. Data typically include technical data related to the products said data being ordered in a hierarchy of data and are indexed to be searchable. The data are representative of the products, which are often modeled objects.

Product lifecycle information, including product configuration, process knowledge and resources information are typically intended to be edited in a collaborative way.

To this respect, a collaborative workspace can be defined as an interconnected environment in which participants in the product lifecycle (design and also marketing, sales, manufacturing, original equipment manufacturers (OEMs), suppliers, and customers) can access and interact with each other's "In-Work" designs, thereby enhancing communication through exchange, direct use, simulation and validation in 3D.

Product data management (PDM) systems refer to tools used to control access to and manage all product definition data of the relational database. This is achieved by maintaining product information (or meta-data). A PDM solution may automatically store and manage product information and facilitates collaboration throughout the enterprise and across the value chain. It may further integrate people and processes by automating and tracking standard workflows within an organization and its supply chain, driving efficiency and accountability, and facilitating standards compliance.

For the sake of completeness, a database is defined usually as a collection of data or information organized for rapid search and retrieval, especially by a computer. Databases are structured to facilitate storage, retrieval, modification, and deletion of data in conjunction with various data-processing operations. A database consists of a file or set of files that can be broken down into records, each of which consists of one or more fields. Fields are the basic units of data storage. Users retrieve database information primarily through queries. Using keywords and sorting commands, users can rapidly search, rearrange, group, and select the field in many records to retrieve or create reports on particular aggregates of data according to the rules of the database management system being used.

Thus, known solutions of CAD/CAM applications make it possible, among other features, to design parts, while a PDM system typically includes a database storing all the data related to the designed products or parts and the relations between said products or parts.

To this respect, the ENOVIA Solutions make it possible to graphically define, share and manage product, process and resource information stored in a PDM database throughout the product lifecycle process.

DELMIA PLM offers a comprehensive suite of digital 3D manufacturing solutions that allow the complete design and validation of a manufacturing process through a digital mock-up. DELMIA PLM thus seeks to enable companies to optimize their manufacturing process before actual production takes place. DELMIA PLM solutions are built on an open product, process and resources model. They enable the continuous creation and validation of the manufacturing process in the following domains:

Process planning: The DELMIA Process Planning suite provides comprehensive process and resource planning support. It creates an environment that allows customers to review the sequences and links between processes and resources early in the product design cycle. Customers can perform planning tasks such as layout planning, time measurement, process and resource planning, product evaluation, cost analysis and factory line balancing.

Process detailing and validation: The DELMIA Process Detailing and Validation suite employs the structure and diagrams of the DELMIA Process Planning solutions. It addresses specific manufacturing issues using actual product geometry and defines processes in detail in a 3D environment. Processes that can be validated in 3D include manufacturing and maintenance, weld point allocations, assembly sequences, factory/cell layouts and machining operations.

Resource modeling and simulation: The DELMIA Resource Modeling and Simulation suite provides the tools to develop and implement the mechanical resources, routines and programming that are used in conjunction with the Process Planning and Process Detailing and Validation solutions. Resources such as robots, tooling, fixtures, machinery, automation and ergonomics are defined and integrated into complete manufacturing scenarios.

DELMIA Solutions today is well adapted to the optimization of manufacturing processes where output products can be seen as a mere assembly of input products, i.e. input products are not significantly transformed during assembly operations. However, in some industries such as shipbuilding for instance, manufacturing process is not a mere assembly of design input sub-products that can be pre-fabricated to exact dimensions and fit exactly with each other. Some of the design input sub-product of the final product need to be prepared and interim sub-products need to be generated that include manufacturing features which are not present on the final design product but which are necessary to perform a subsequent manufacturing operation.

Such interim sub-products can not be automatically defined by the capture of a final design product because some of the manufacturing features linked to interim sub-product are process specific, i.e., the manufacturing features are specified by the process and the resource through which it is produced. Notably, the manufacturing features are consumed (i.e. disappear) during a subsequent manufacturing process step.

For instance, when assembling several sub-products together to form a new product, operators first need to retrieve them from a buffer, accurately position them against each other before finally welding them. In order to facilitate these operations, different marks are accommodated. Identifier of the sub-product to be assembled helps the operator retrieve the right one. Attachment lines and alignment marks help the operator properly position it. This reduces the need for operators to constantly relate to paper drawings that are expensive to produce and usually obsolete.

Also, heavy steel parts tend to shrink and distort whenever heated during welding operations, due to high temperature gradients. Therefore an interim sub-product must be provided with extra-length when cut to compensate for subsequent welding operation. This manufacturing feature called "added-material" is consumed when welding is later carried out during an assembly step.

Also, good welding procedures require edges to be prepared. This means an input interim sub-product must be provided with some bevels along the welded edges. Shape of bevels is a function of the welding procedure, as well as the beveling machine.

Another example is to account for the fact that interim sub-products can undergo some operations the design parts were not designed for. For instance, workers will have to walk on a panel and may fall through cutouts during intermediate assembly stages. This means the input interim sub-products must be provided with tabbed or marked cutout that will be cut during a later assembly stage.

For sake of clarity, it should be understood that the expression "product" refers to output products, input products or sub-products (as well as terminal raw piece material product) depending on the entry point on the manufacturing process that is considered. On the other hand, the expression, "interim product" refers to temporary products used during the manufacturing process.

PROBLEM TO BE SOLVED

CATIA users design products as they are in the final marketed product, so called output products, while in contrast, DELMIA users have to work on interim products and input product which are those effectively needed during the manufacturing process.

Today, interim sub-products are typically designed by skilled experts who have a deep and global understanding of the detailed manufacturing process. Those skilled experts provide for manufacturing preparation tasks; they design the interim sub-products that will be needed throughout the manufacturing process steps and they transform each interim sub-product part into workshop documents, traditionally in the form of 2D-drawings or NC-data (Numeric Control), for use by machines and operators.

This manual generation of interim product parts requires a significant amount of detailed expertise. This expertise and knowledge represents lots of tricky, specific rules that tend to change over time, are difficult to document and are not easily transmitted to new employees. Moreover, performing these repetitive but mandatory tasks for millions of interim product parts consume a considerable amount of time, from both operators and computers. Some feedbacks from ship building sites show that the manufacturing preparation tasks take about as much time to perform than the detail design tasks themselves. The associated cost inhibits ability to perform design changes on the modeled product. In addition, the use of 2D-drawings requires mental conversions that prevents operations from being performed by automates.

There is therefore a need for a manufacturing process orientated approach to transform engineering specifications of a designed output product and generate the corresponding input products needed for the manufacturing process.

SUMMARY OF THE INVENTION

The invention therefore proposes system and method for defining such input products starting from a final design product and by recursively down streaming all the manufacturing and preparation operations needed to obtain said final product. An improved DELMIA Solution can therefore be implemented. The method of the invention defines an input product to be manufactured into an output. It derives the input product from the output product and its corresponding manufacturing process.

More specifically, the invention proposes a computer implemented method for defining an input product to be manufactured into an output product, comprising the steps of:
  (a) receiving an output product having attributes and comprising at least one sub-product, said sub-product having attributes;
  (b) associating to said output product a manufacturing operation identified among a plurality of manufacturing operations;
  (c) defining attributes of said input product, said input product attributes deriving from modification of attributes of the at least one sub-product according to the associated manufacturing operation.

According to one embodiment, the manufacturing operation in step (b) is associated to said output product according to the attributes of said output product.

According to one embodiment, the attributes of said input product are defined in step (c) according to:
  attributes of the at least one sub-product, and
  manufacturing features required by the associated manufacturing operation.

According to one embodiment, in step (b), a set of manufacturing operations are associated to said output product, and in step (c), the attributes of said input product are derived from modification of attributes of the at least one sub-product according to the associated set of manufacturing operations.

According to one embodiment, the computer implemented method of the invention further comprises the steps of:
  (d) receiving a sub-product as a new output product, and
  (e) defining attributes of a new input product by repeating steps (b) and (c).

According to one embodiment, step (d) is repeated until no more manufacturing operation can be associated to a received output product.

The invention is also directed to a computer executable program code stored in a computer readable medium or in a signal, suitable for implementation of the method of the invention.

The invention further relates to a computer assisted manufacturing process using the computer implemented method of the invention. The CAM process comprises the steps of:
  (i) receiving at least one input product;
  (ii) identifying a manufacturing operation to be carried out on said input product according to attributes of said input product;
  (iii) matching the identified manufacturing operation with a manufacturing shop and routing said at least one input product to said shop;
  (iv) providing an output product by performing the identified manufacturing operation on said at least one input product.

According to embodiments, the computer assisted manufacturing process using the computer implemented method of the invention further comprises one or more of the following features:
  manufacturing features required by the identified manufacturing operation are displayed on a user's screen;
  at least one manufacturing feature required by the identified manufacturing operation is consumed when performing the identified manufacturing operation;
  a manufacturing feature is created when performing the identified manufacturing operation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Various embodiments of the invention are now discussed, in reference to the drawings, in which.

DETAILED DESCRIPTION OF THE INVENTION

A description of example embodiments of the invention follows.

Figure 1:
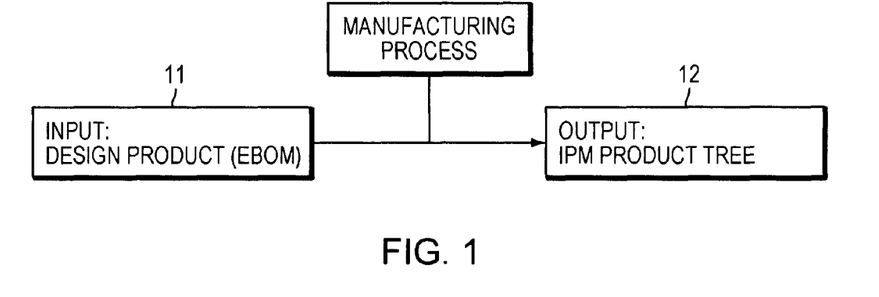
FIG. 1 is a flowchart illustrating the generation of an IPM Product Tree according to the invention.

The computer implemented method of the invention proposes to derive input products from the output product to be manufactured with a process oriented approach. As illustrated in FIG. 1, the design specifications (EBOM, for Engineering Bill Of Material) 11 of a final product to be manufactured are transformed into an IPM Product Tree (In-Process Model Product Tree) 12. The IPM Product Tree comprises input product specifications, which includes the manufacturing features required to manufacture the final design product.

Figure 2:
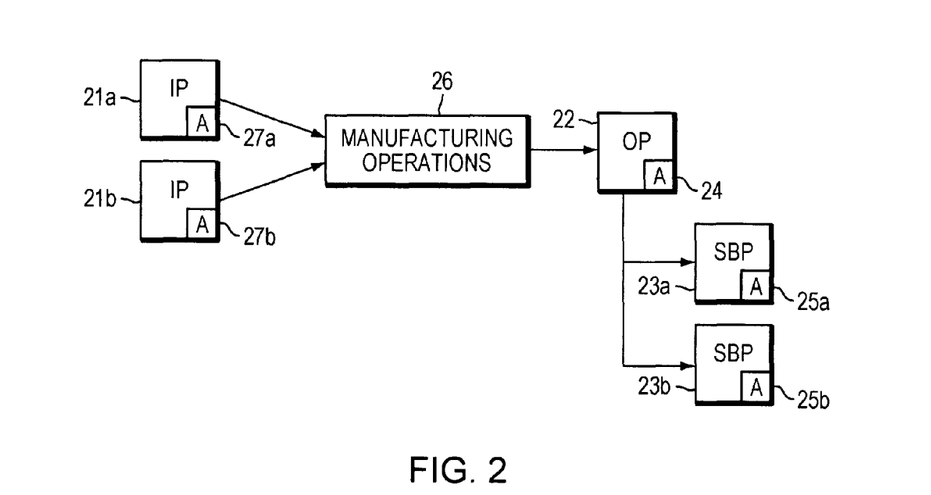
FIG. 2 is a flowchart illustrating the computer implemented method of the invention.

FIG. 2 shows input products (IP) 21 to be manufactured into an output product (OP) 22 comprising at least one sub-products (two sub-products SBP 23a,b are illustrated). The output product 22 has attributes (A) 24 and the sub-products 23 have respective attributes (A) 25a,b. In the context of the invention, the attributes 24,25 represent the product specifications including design specifications, such as dimensions, shape and so on, as well as manufacturing features specifications that are required by the manufacturing operations 26, such as attachment lines, forming lines, edge preparation, opening preparation shrinkage compensation material and so on.

According to the invention, the attributes 27 of an input product 21 will derive from modification of attributes 25 of at least one sub-product 23 according to an associated manufacturing operation 26 associated to the output product 22.

The computer implemented method for defining product specifications according to the invention will be described with reference to various examples in order to illustrate how input product attributes 27 are defined according to the manufacturing process 26 of the output product 22. The output products chosen as examples are simple products; but it will easily be understood by the ones skilled in the art that any other more complex design product are concerned by the invention. In particular, for application to shipyard building sites, a full ship design model would be the final design output product. However, for sake of simplicity, only portions of the ship are considered as the "output product" in the following examples of the description. Similarly, one should understand that the invention is not limited to ship building industry, but can be applied to any manufacturing industry.

Description of First Example

A first example will be described with reference to FIGS. 3 to 15 relating to a "stringer panel" as the output product 31, i.e. the target design product to be manufactured. The computer implemented method of the invention will define attributes of input products to be used for manufacturing said stringer panel output product 31.

Because the attributes of the input products are defined through a manufacturing process approach, the following description will first describe the manufacturing process to produce the stringer panel 31. Then, how every input product is defined, using a process-driven approach, will be described.

Figure 3:
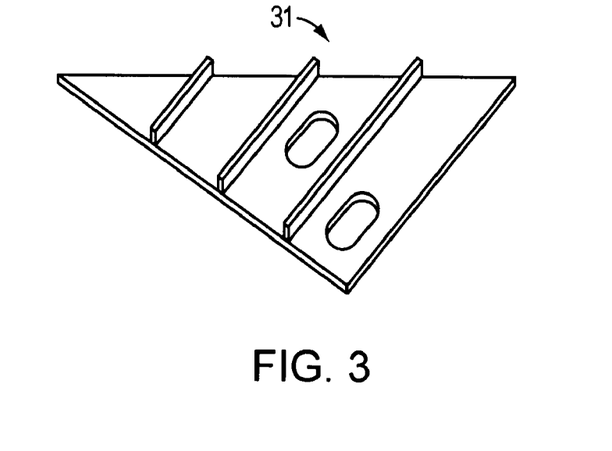
FIG. 3 is a first example of a manufactured output product.
Figure 4:
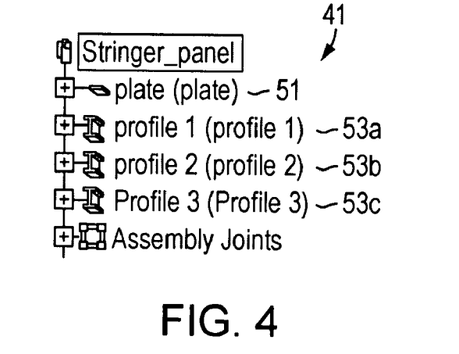
FIG. 4 is a Product Structure Tree of the output product of FIG. 3.
Figure 5:
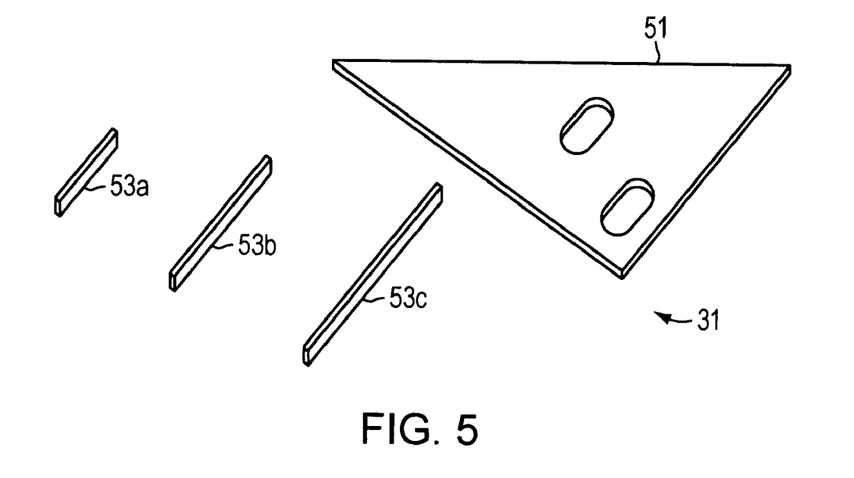
FIG. 5 shows the sub-products of the output product of FIG. 3.

FIG. 3 shows a design view of a stringer panel product 31. This is the target design to be manufactured. It was designed, for instance, using structure design capabilities of CATIA. FIG. 4 shows its product structure tree 41 and FIG. 5 shows an exploded view of the sub-products 51,53 of the stringer panel assembly. As shown in FIGS. 4 and 5, the stringer panel output product 31 is an assembly product node that consists of four sub-products: one plate 51 and three straight profiles 53a,b,c, called profile 1, profile 2 and profile 3.

Figure 15:
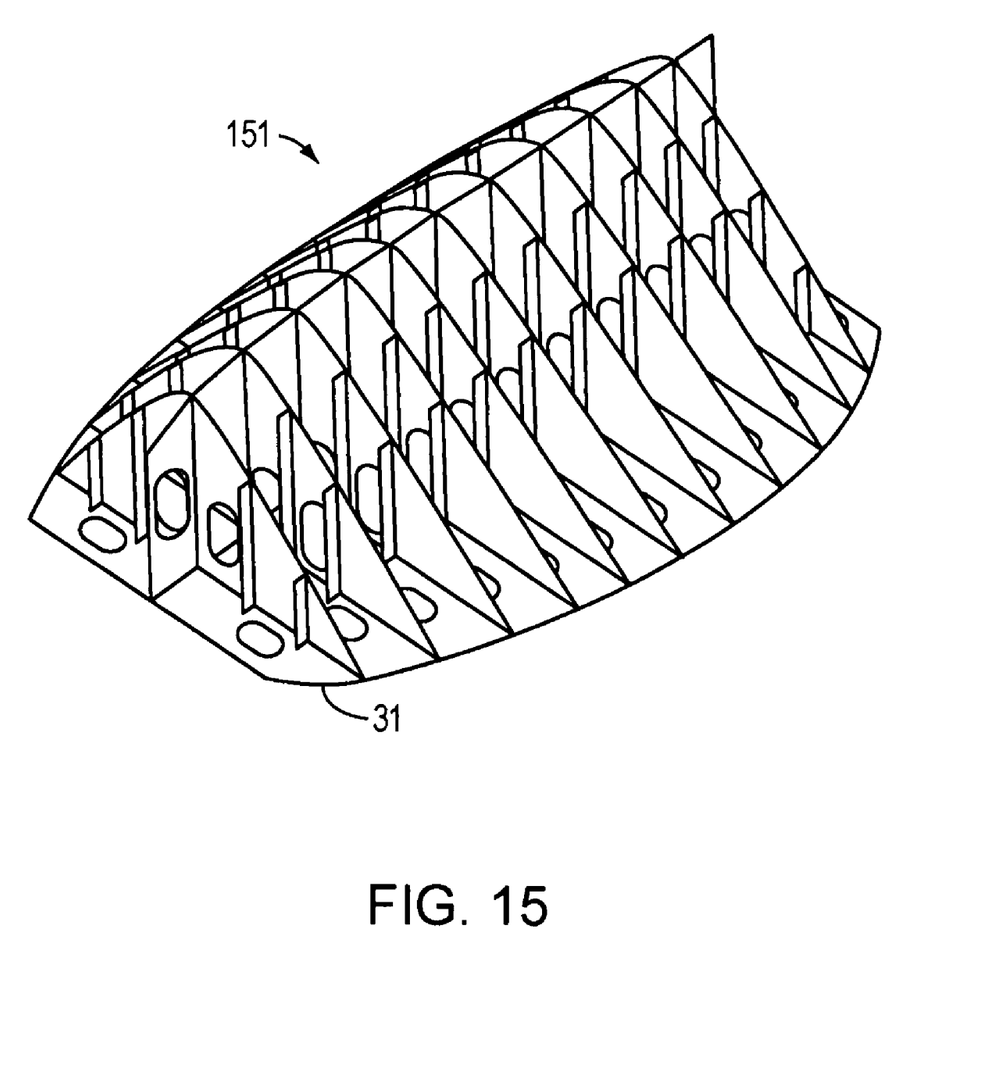
FIG. 15 show another output product comprising the product of FIG. 3 as a sub-product.

In this example, each sub-product happens to be a "terminal" piece part, i.e. a product that cannot be broken further down into smaller sub-assembly product nodes. A terminal piece part is fabricated as a whole from raw material. In a more complex example, as illustrated in FIG. 15, this stringer panel product 31 will in turn become a sub-product that is part of a higher level assembly product node 151, for instance a bigger section of a ship.

Each product, be it an output product or a sub-product is characterized by a number of attributes.

In this first example, the stringer panel output product 31 comprises the following attributes (for sake of simplicity only some attributes are considered, but a product may include a lot more attributes):
- its type: "panel": i.e. assembly made of a large plate and stiffening profiles
- the number and types of sub-products it is made of
- the assembly of sub-products: where and how it is assembled
- the fact it is flat Further, the plate sub-product 51 of the stringer panel output product 31 is characterized by the following attributes:
- its type: "plate", i.e. something cut from a larger raw plate
- the material, grade and thickness of the raw plate it is cut from
- the fact it is flat
- the geometry of its external contour
- the type of two oblong cut-out holes in it,
- the dimensions and location of the two cut-out holes.

Figure 6:
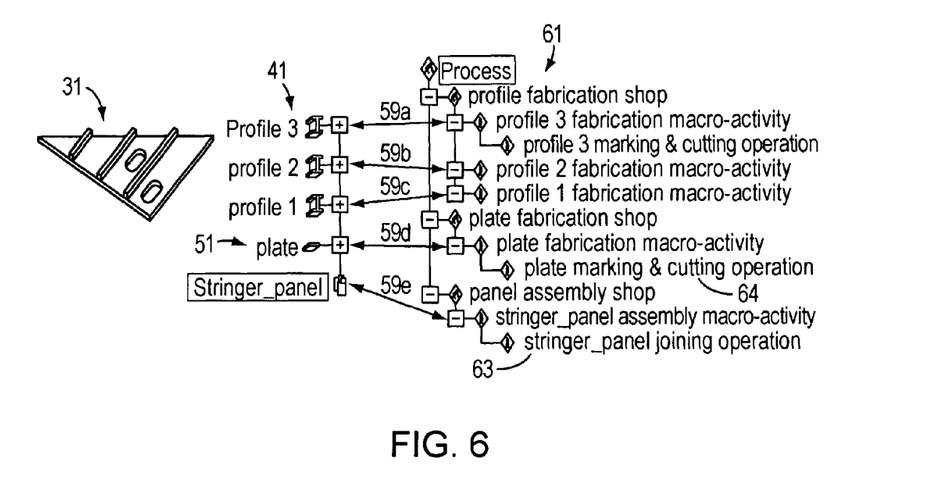
FIG. 6 illustrates the manufacturing process to produce the output product of FIG. 3.

In the same way, the three profiles sub-products 53a,b,c, of the stringer panel output product 31 are each characterized by the following attributes:
- their type: "profile", i.e. something cut from larger raw profiles
- the material, type and dimensions of their section (i.e.: "flat bar" 130 by 6 mm)
- the fact they are straight
- the fact they do not have any cutouts FIG. 6 describes the manufacturing process to produce the stringer panel output product 31. The manufacturing process 61 is generated from the product structure tree 41 described in FIG. 4. Each product, be it an output product 31 or sub-products 51,53 form a product node and is produced by a given macro-activity. In the example of FIG. 6, there are five different macro-activities 59 to produce five different products: one plate sub-product 51, three profiles sub-products 53 and one stringer panel output product 31.

Although every product described above is different, one can see that the three profiles 53, although different (in length), are similar enough to dedicate a specific manufacturing shop containing some machines specialized to perform all the operations necessary to produce such profiles.

This approach is a simple illustration of a what is referred to as "Group Technology", whose objectives is to bring the benefits of mass production (i.e. permanence of location and specialization of machines, moving products to machines, balancing product flow, etc. . . . ) to a high variety of different products. Group Technology therefore calls for these different products to be classified into groups of similar products, according to their shape, material, size, etc. . . . Different manufacturing shops are therefore specialized to produce such a group of similar products, while still accommodating some level of variation between products.

In the example of the stringer panel output product 31, there are three different manufacturing shops involved that are dedicated to perform each a different type of macro-activity 59 for any number of products in that group:
1. one plate fabrication macro-activity 59d, performed within a plate fabrication shop
2. three profile fabrication macro-activities 59a,b,c, performed within a profile fabrication shop
3. one panel assembly macro-activity 59e, performed within a panel assembly shop.

It should be noted that, although the stringer panel output product 31 consists of four sub-products, the assembly activity 59e does not consist of activities to fabricate each of them. Instead they are sequential activities 59 which feed each other. Let's take a daily life analogy to explain that: although breakfast consists of bread, it is not the right time to bake it. Instead bread is expected to be found in a shelf. In the same way, the panel assembly activity is not the right time to fabricate the plate and profiles sub-products. Hence the fundamental difference between product 41 and process trees 61 in FIG. 6.

A macro-activity 59 may be further broken down into a set of manufacturing operations, which describe the necessary steps to prepare the input sub-products in order to produce the output product. In our example, the macro-activity 59*e* that produces the stringer panel output product 31 goes through only one operation: a panel joining operation 63, as shown in FIG. 6, but requires that the sub-products 51,53 were prepared for it.

Figure 7:
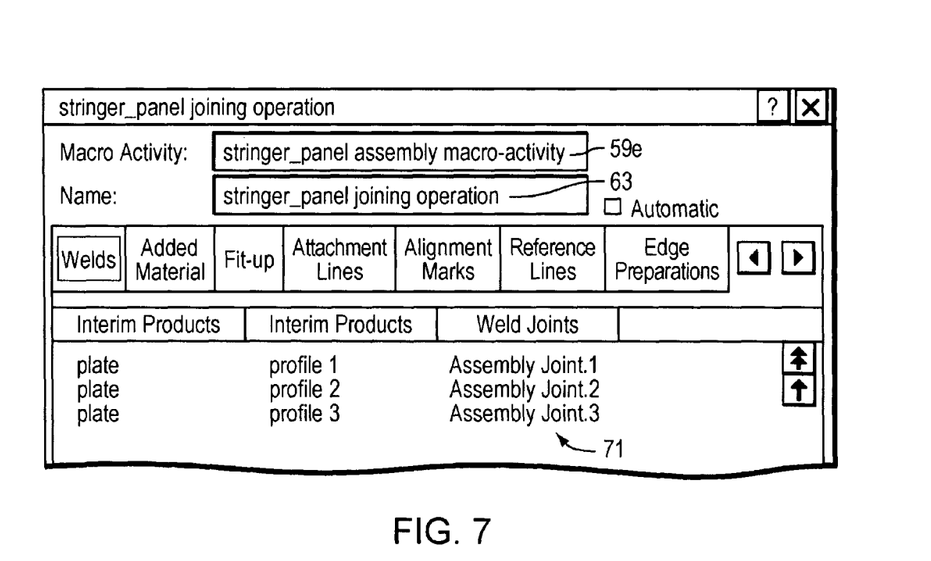
FIG. 7 is a screen shot of a control window for the assembly operation to produce the output product of FIG. 3.

FIG. 7 illustrates what the joining manufacturing operation 63 captures. First of all, the joining operation captures the fact that it needs to perform three welds joints 71, so as to tightly fasten the three profiles sub-products 53 to the plate sub-product 51. However, that's not all there is to capture, because there are a number of considerations that are essential to achieve that operation in an optimal way in terms of quality, productivity, safety . . . . These considerations include, among others:

- the sub-products 51,53 must be available. This obviously assumes the sub-products have actually been fabricated and commissioned to the right buffer in the right shop in due time.
- The sub-products 51,53 must then be retrieved from their corresponding buffers. This requires identifiers marked directly on the parts, such as human readable texts marked with ink, or machine readable bar-codes; etc. . . .
- The sub-products 51,53 must then be properly positioned and fitted against each other prior to welding them. This requires all kinds of marks provided on the products such as attachment lines, thickness throw indicators, alignment match marks, reference lines, matching labels, etc. . . .
- Once positioned and fitted, sub-products 51,53 can then be welded. Welding operation is critical, as it directly impacts the structure integrity. Depending on the technology of welding procedure, different types of preparation may be needed, which include: edge-preparation, grinding, etc. . . .
- During and after welding, due to high temperature gradients, some sub-products tend to distort, hence modifying the product geometry. This distortion must be both monitored and compensated for, so as to enable downstream fitting operations. This requires other types of preparations that include shrinkage compensation, accuracy control points, reference marking lines, etc. . . .
- Welding or accuracy control operations may require the operator to walk on the manufactured product. Safety rules require that openings be removed, preventing injuries. Openings can also be marked rather than cut in order to prevent welding arcs from running down when crossing a cutout.
- Once the output product 31 is produced, it must be transported and commissioned to a downstream buffer or storage area where it may stay idle for some time. Here again, safety requires some preparation to be made that includes lugs, extra pillars, extra stiffening, etc. . . . which secures the output product in a safe position.

Figure 8:
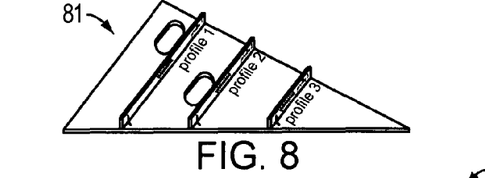
FIG. 8 shows required manufacturing features on the output product of FIG. 3.
Figure 9:
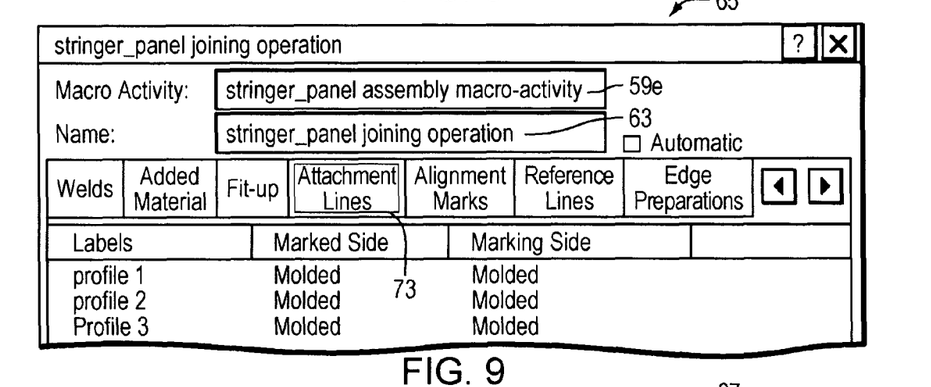
FIGS. 9 to 12 are screen shots of a control windows for capturing required manufacturing features.
Figure 10:
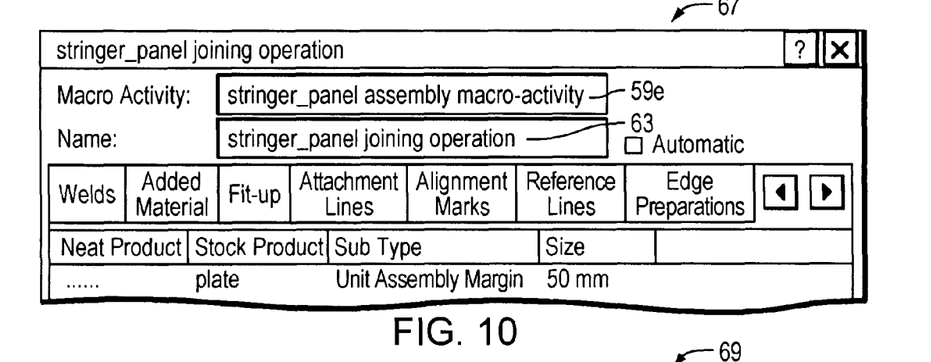
Figure 11:
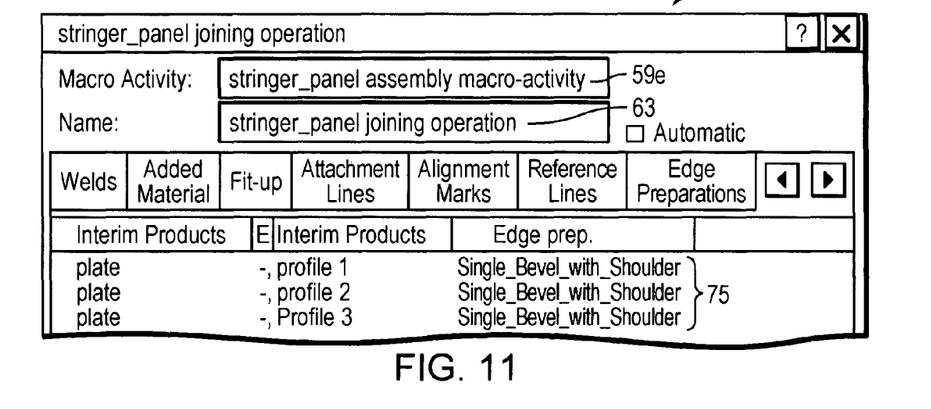
Figure 12:
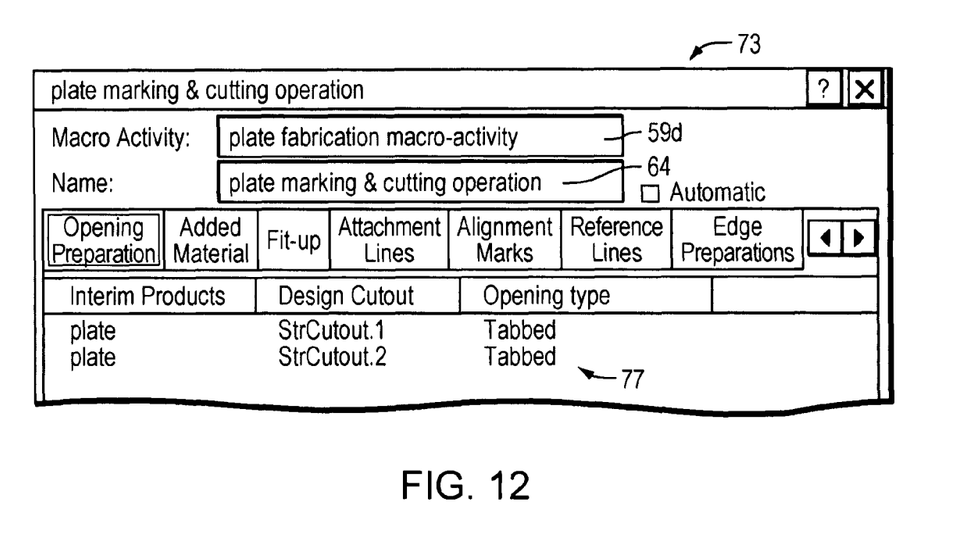

These manufacturing process considerations are captured under the form of required manufacturing features 81, providing for these features are traditionally referred to as "work preparation". In this first example, the required manufacturing features 81 are illustrated in FIG. 8 and include:

- Attachment lines 73 to help position profiles 53 on plates 51, which are captured using a control window 65 as illustrated in FIG. 9
- Extra length of material to compensate shrinkage, which is captured using a control window 67 as illustrated in FIG. 10
- Edge preparation 75 of a given type is required along the edges of profiles, which is captured using a control window 69 as illustrated in FIG. 11
- Openings are tabbed 77, i.e. half cut with four tab points being provisioned, which are captured using a control window 73 as illustrated in FIG. 12.

As described above, the manufacturing process 61 of producing a given design output product 31 consists of manufacturing operations 63,64 that not only refer to how this given output product is produced, but also capture the need for various types of manufacturing features 81 to be provided in the input products it is built from.

In other words, a downstream assembly activity is explicitly capturing what preparation it expects to be found on its input products. This process-driven generation of manufacturing features on input products is essential to improve productivity of assembly operation and to avoid cost ineffective feedback loops between shops.

Figure 13:
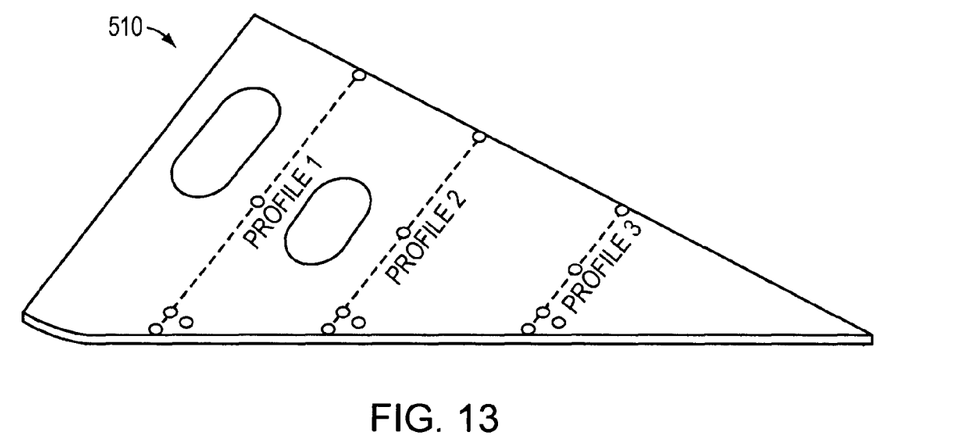
FIG. 13 shows an input product to be manufactured into the output product of FIG. 3.

Going back to the example of the stringer panel assembly output product 31, the input products to be manufactured into said output product are not simply the sub-products 51,53 illustrated in the exploded view in FIG. 5. FIG. 13 (to be compared to FIG. 5) shows the input plate product 510 with all the preparation required by the downstream assembly operation: i.e. three attachment lines, three labels of attached products, three thickness throw indicators, two tabbed openings. In a similar way, FIG. 14 (to be compared to FIG. 5) shows the input profile product 530 with all the preparation required by the downstream assembly operation: i.e. one alignment match mark, one edge preparation along bottom edge, one identification mark.

Figure 14:
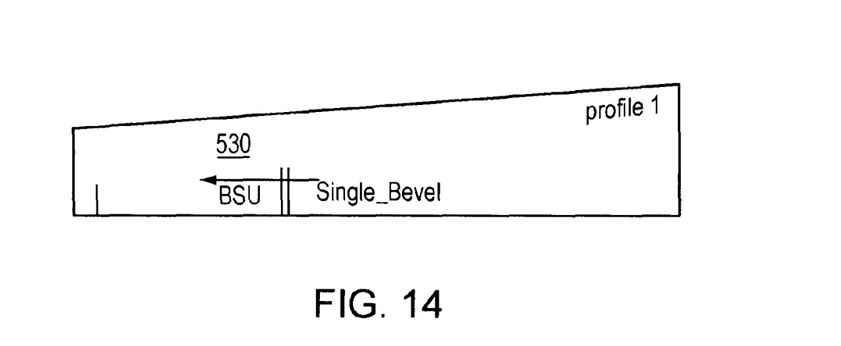
FIG. 14 shows another input product to be manufactured into the output product of FIG. 3.

According to the method of the invention, an input product 510,530 can therefore be defined with attributes deriving from modification of the attributes of a sub-product 51,53 according to an associated manufacturing operation 63,64.

An input product 510 (plate of FIG. 13) has attributes defined according to the attributes of a sub-product 51 (FIG. 5):

- the material, grade and thickness of the raw plate it is cut from
- the fact it is flat
- the geometry of its external contour
- the type of two oblong cut-out holes in it,
- the dimensions and location of the two cut-out holes, and according to manufacturing features 81 required by a manufacturing operation 64 associated to the output product 31 to manufacture:

- Attachment lines,
- Extra length of material to compensate shrinkage,
- Tabbed openings.

The manufacturing operation 63,64 which defines the required manufacturing features 81, is associated to the output product 31 according to attributes of the output product. For instance, in this first example, the assembling operation 63 is associated to the stringer panel output product 31 according to the attributes of said product (panel type, number and types of sub-products it is made of, where and how sub-products are assembled).

Of course the same reasoning applies when a set of manufacturing operations 63,64 are associated to the output product 31, i.e. when the macro-activity 59 to produce the output product goes through more then one manufacturing operation. It is also clear from FIG. 15, that this reasoning can be duplicated at any stage of a complex manufacturing process, an output product 31 becoming a sub-product in another product assembly node 151.

When running the computer implemented method of the invention, the routine of defining attributes of input products according to attributes of sub-products (e.g. 51, 53) and required manufacturing features (e.g. 81) is repeated on each sub-product until no more manufacturing operation 63,64 can be associated to a received output product 31 (arriving to a "terminal piece part" of process tree 61 made from raw material).

Description of Second Example

A second example will be described with reference to FIGS. 16 to 21 relating to a "curved plate" as the output product 163. The computer implemented method of the invention will define attributes of an input product to be used for manufacturing said curved plate output product 163.

Figure 16:
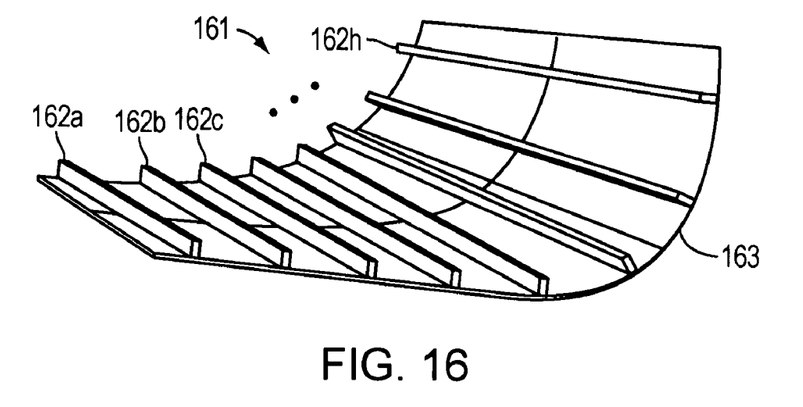
FIG. 16 shows an output product comprising the product of FIG. 18 as a sub-product.

FIG. 16 shows a large curved shell panel 161, which consists of eight curved plates (such as at 163) and eight twisted profiles 162a, b, c, d, e, f, g, h to be assembled together during a so-called "curved panel assembly macro-activity". Here again, this activity is performed in a dedicated manufacturing shop, with specialized resources.

Figure 17:
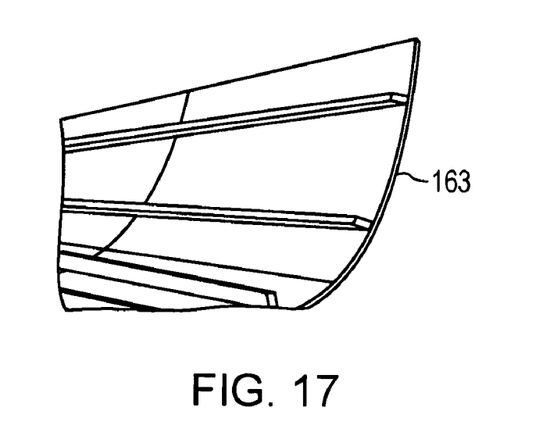
FIG. 17 is a detailed view of a portion of the output product of FIG. 16.
Figure 18:
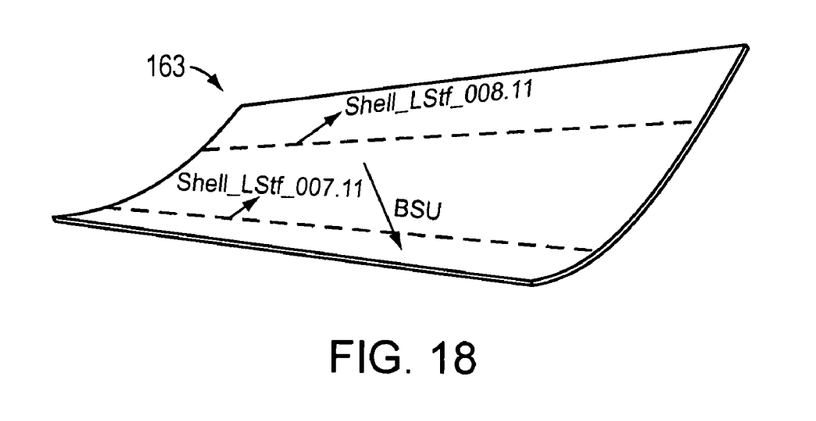
FIG. 18 is a second example of a manufactured output product.

However, in this example, we focus on one of the eight shell plates of the curved panel 161, as shown in FIG. 17, and we will consider the curved plate 163 with attachment lines shown in FIG. 18 as the output product to be manufactured. This curved plate output product comprises only one sub-product (the curved plate 163) and will become a sub-product of the curved shell panel product 161 of FIG. 16.

Figure 20:
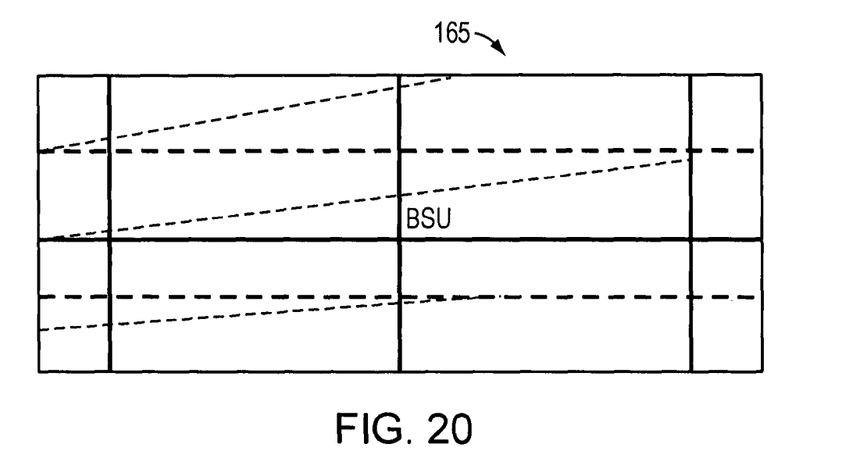
FIG. 20 shows an input product to be manufactured into the output product of FIG. 18.

The flat plate 165 with various marking lines shown in FIG. 20 is the input product that undergoes a forming operation to be manufactured into the output product 163 of FIG. 18. As already described in previous example relating to the "stringer panel", the joining operation requires some attachment lines to be provided on each individual plate. The product that is expected as an input to a downstream assembly activity is a curved plate 163 with a few attachment lines as shown in FIG. 18. This input product 165 must therefore be prepared during an upstream fabrication activity.

The curved plate output product 163 of FIG. 18 comprises, among others, the following attributes:
 its type: "plate", i.e. something cut from a larger raw plate
 the material, grade and thickness of the raw plate it is cut from
 the fact it is curved
 the mathematical definition of the curved support
 the geometry of its external contour
 the fact it carries two attachment lines It can be noted that the attachment lines attributes are manufacturing features that will be required in a downstream manufacturing operation when the curved plate product 163 will be a sub-product of another assembly node (the curved panel product 161 of FIG. 16).

The "Group Technology" approach that was discussed in the previous example calls for similar products to undergo a similar manufacturing process in a dedicated shop. In this case, based on its attributes, this plate 165 is routed to a given type of macro-activity that specializes in fabrication of curved plates i.e.; marking, cutting and forming them.

Figure 19:
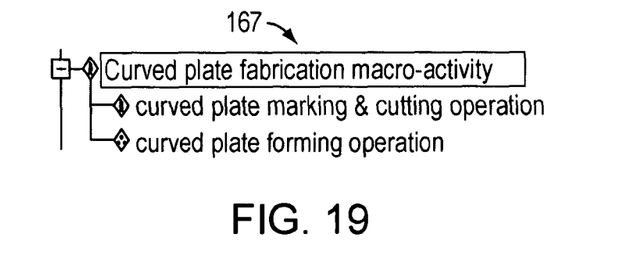
FIG. 19 illustrates the manufacturing process to produce the product of FIG. 18.

FIG. 19 describes the manufacturing process 167 to produce the curved plate output product 163 and consists of two simple operations:
 1. plate is marked and cut from a larger flat raw plate from stock,
 2. plate is formed to get expected curved shape This set of manufacturing operations is associated to the curved plate output product 163 according to the attributes of the curved plate. However, here again, in order to perform the forming operation, it is not enough to simply capture the target curved geometry to be reached. Other considerations must be taken into account so as to optimize its performance in a real manufacturing process:
 First, the forming operation captures the number for roll lines to be marked on the plate. These roll lines will then be used by operators on roll-bending machine to align the top-roll and therefore apply a primary curvature (i.e. curvature in one direction) to the plate.
 A neutral axis needs to be positioned on the plate, (i.e. the location of the actual surface to be flattened within the thickness of the plate) given the material, thickness and geometry of the plate.
 Distortion panel captures the technology that can be used when the plate is not developable, i.e. when secondary curvature needs to be applied to the plate due to distortion (stretching and shrinking the steel in the planar directions of the plate).
 Operators will require templates to check whether the expected curvature has been reached. Templates need to be positioned on the plate and aligned with each other, therefore requiring more reference lines.
 The cutting and marking tool can only access one side of the plate.

These considerations are captured under the form of required manufacturing features. In our example, the required manufacturing features are illustrated on the input product 165 in FIG. 20:
 three roll lines (represented as dot-dashed lines) required to apply primary curvature to the plate, i.e. for positioning in the roll-bending machine;
 three transverse positioning lines (represented as plain white lines) indicate locations for templates.
 one longitudinal line (represented as a plain white line) indicates location of sight plane to align the templates.
 one BSU (Burn Side Up) mark indicates the plate side facing the marking and cutting tool.

In addition to the manufacturing features, attributes of the input product 165 of FIG. 20 also include two attachment lines (represented as regular dot lines) that are requested by a downstream assembly activity, to help position profiles 162 on plates as shown in FIG. 17. It is noted that these attachment lines attributes were already attributes of the sub-product (identical to the output product in this example).

Figure 21:
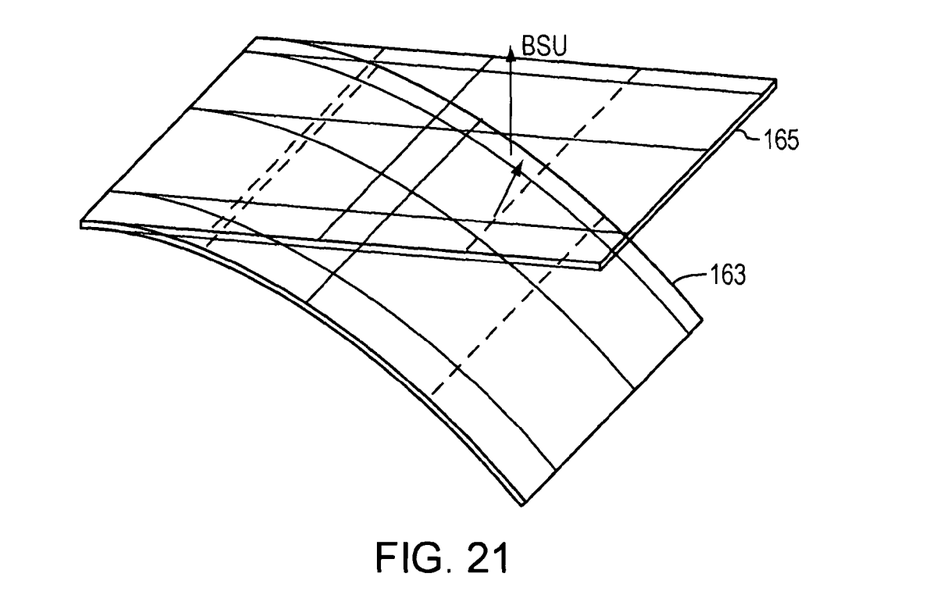
FIG. 21 compares the input product of FIG. 20 with the output product of FIG. 18.

FIG. 21 (to be compared to FIG. 17) shows the input flat plate product 165 to be manufactured into a curved plate 163 (FIG. 18) with all the preparation required to perform the two downstream manufacturing operations: a forming operation and an assembly operation.

According to the method of the invention, an input product can therefore be defined with attributes deriving from modification of the attributes of a sub-product according to an associated manufacturing operation. The input product 165 (FIG. 20) has attributes defined according to the attributes of a sub-product 163 (FIG. 18)—including attachment lines—and according to manufacturing features—including roll lines, templates line and sight plane line—required by a set of manufacturing operations associated to the output product to manufacture (FIG. 18).

Description of Application

Ultimately, the computer implemented method of the invention is to be used as a VPLM (Virtual Product lifecycle Management)/CAM program in a manufacturing process.

Such a computer assisted manufacturing program user would receive at least one input product (the flat plate 165 of FIG. 20 for instance) and identify a manufacturing operation to be carried out on said input product according to attributes of said input product as defined by using the computer implemented method of the invention. For instance, a forming operation is identified according to the roll lines, templates line and sight plane line attributes of the flat plate 165 of FIG. 20.

The CAM user then matches the identified manufacturing operation to a manufacturing shop comprising the required resources to carry out the micro-activity to perform the identified manufacturing operation. An output product is therefore provided by performing the identified manufacturing operation.

The manufacturing features required by the various identified manufacturing operations can be displayed on the user's screen. Therefore, for each input product, the user can control the required manufacturing features and edit workshop documents to be used by machines and operators in a micro-activity manufacturing shop.

Depending on the identified manufacturing operation, manufacturing features can be consumed when performing an identified manufacturing operation; for instance, roll lines, template lines and sight plane line are consumed when performing the forming operation on flat plate input product. In a similar way, manufacturing features can also be created when performing an identified manufacturing operation; for instance attachment lines are created when performing the marking and cutting operation on flat the plate input product. The consuming and creation of manufacture features can be controlled by displaying the manufacturing features on the user's screen when displaying products.

Design changes on the final output product are therefore possible at lower costs because the design changes can be implemented in input products by running the method of the invention that will automatically (re)define attributes of the impacted input products. Design modifications can be directly and automatically taken into account in input products.

The method according to the invention can be part of a PDM system including a database storing all the data (including attributes) related to the products (input, output, sub-products, and possibly interim products), the relationships between said products and the manufacturing process steps.

Figure 22:
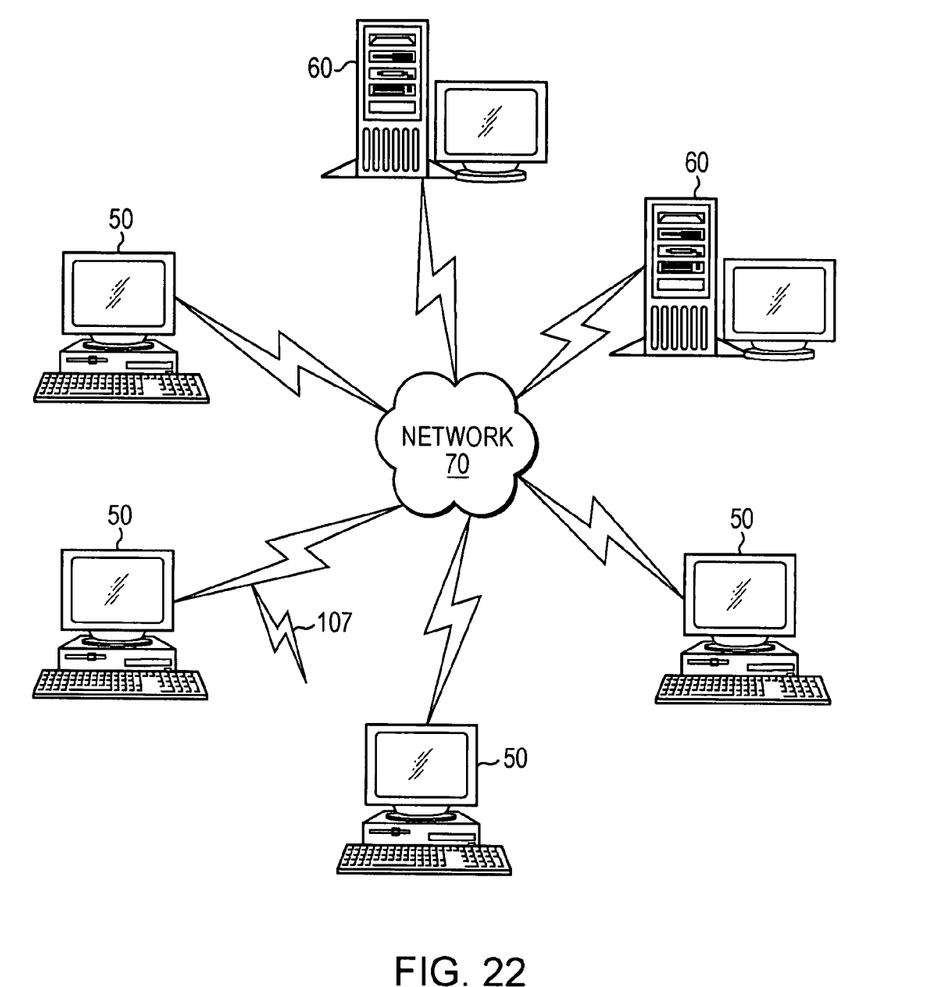
FIG. 22 is a schematic view of a computer network environment in which embodiments of the present invention may be implemented.

Accordingly, FIG. 22 illustrates a computer network or similar digital processing environment in which the present invention may be implemented.

Client computer(s) 50 and server computer(s) 60 provide processing, storage, and input/output devices executing application programs and the like. Client computer(s) 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 23:
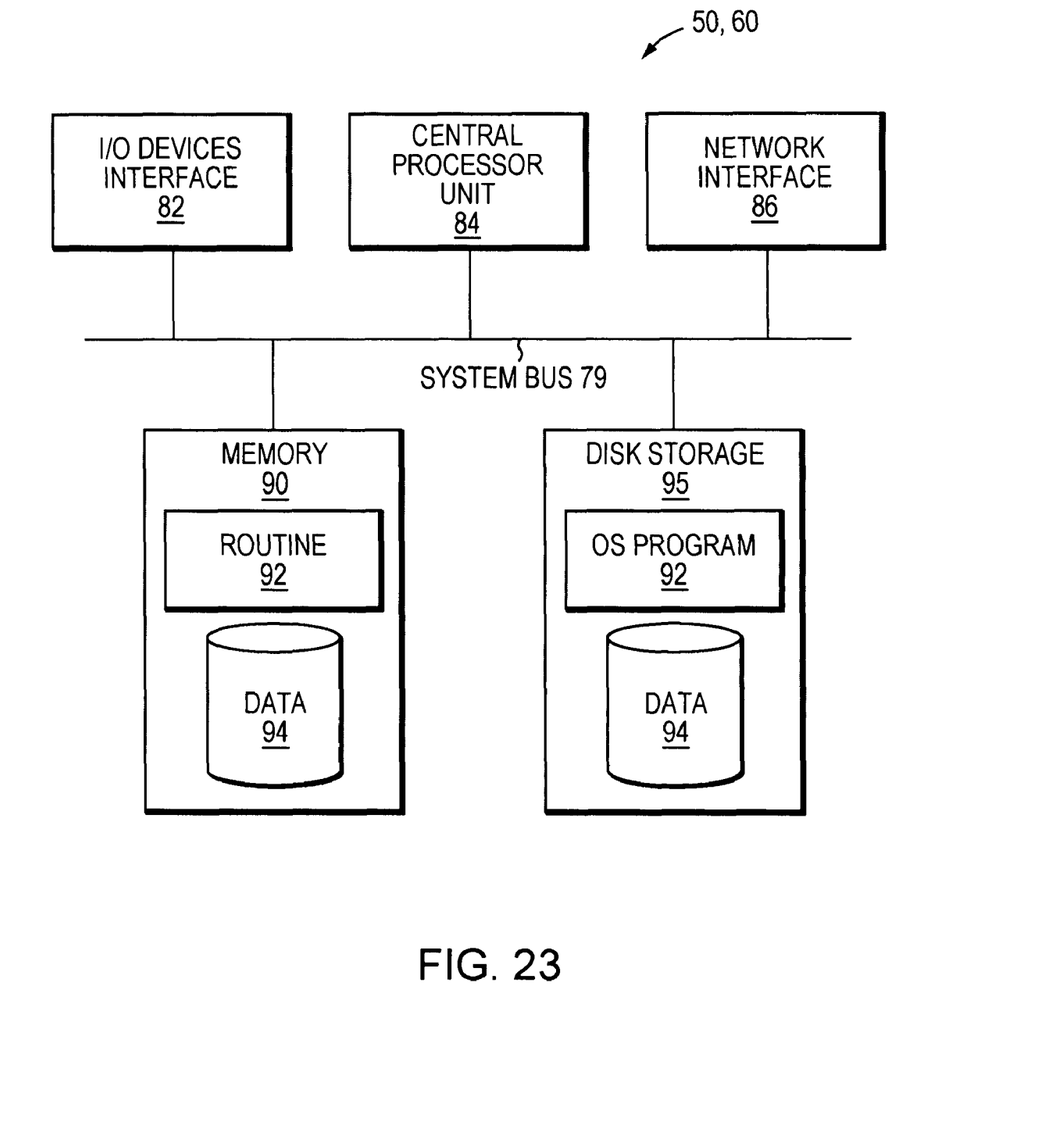
FIG. 23 is a block diagram of a computer node in the network of FIG. 22.

FIG. 23 is a diagram of the internal structure of a computer (e.g., client processor 50 or server computers 60) in the computer system of FIG. 22. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 22). Memory 90 provides volatile storage for computer software instructions 92 and data 94 used to implement an embodiment of the present invention (e.g., attributes of a sub product (output product), associated manufacturing operations, corresponding manufacturing features for input product and method/process for deriving and defining same detailed above in FIGS. 1 through 21). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 22 and 23 are for purposes of illustration and not limitation of the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

What is claimed is:

1. A computer implemented method for defining an input product to be manufactured into an output product, comprising steps of:
    (a) receiving an output product having attributes and comprising at least one sub-product, said sub-product having attributes;
    (b) associating to said output product a manufacturing operation identified among a plurality of manufacturing operations;
    (c) defining attributes of said input product, said input product attributes deriving from modification of attributes of the at least one sub-product according to the associated manufacturing operation,
wherein attributes of said input product include: (i) design specifications, and (ii) consumable manufacturing features specifications.

2. The computer implemented method of claim 1, wherein in step (b) the manufacturing operation is associated to said output product according to the attributes of said output product.

3. The computer implemented method of claim 2, wherein in step (c), the attributes of said input product are defined according to:
    attributes of the at least one sub-product, and
    manufacturing features required by the associated manufacturing operation.

4. The computer implemented method of claim 3, wherein in step (b), a set of manufacturing operations are associated to said output product, and wherein in step (c), the attributes of said input product are derived from modification of attributes of the at least one sub-product according to the associated set of manufacturing operations.

5. The computer implemented method of claim 4, further comprising the steps of:
    (d) receiving a sub-product as a new output product, and
    (e) defining attributes of a new input product by repeating steps (b) and (c).

6. The computer implemented method of claim 5, wherein step (d) is repeated until no more manufacturing operation can be associated to a received output product.

7. The computer implemented method of claim 1, wherein in step (c), the attributes of said input product are defined according to:
    attributes of the at least one sub-product, and
    manufacturing features required by the associated manufacturing operation.

8. The computer implemented method of claim 1, wherein:
    in step (b), a set of manufacturing operations are associated to said output product; and
    in step (c), the attributes of said input product are derived from modification of attributes of the at least one sub-product according to the associated set of manufacturing operations.

9. The computer implemented method of claim 1, further comprising the steps of:
    (d) receiving a sub-product as a new output product, and
    (e) defining attributes of a new input product by repeating steps (b) and (c).

10. A computer program product having a computer readable medium enclosing a computer executable program code, the program code when executed by a computer running a computer implemented method comprising the steps of:
    (a) receiving an output product having attributes and comprising at least one sub-product, said sub-product having attributes;
    (b) associating to said output product a manufacturing operation identified among a plurality of manufacturing operations;
    (c) defining attributes of said input product, said input product attributes deriving from modification of attributes of the at least one sub-product according to the associated manufacturing operation,
wherein attributes of said input product include: (i) design specifications, and (ii) consumable manufacturing features specifications.

11. A computer program product of claim 10, wherein in step (b) the manufacturing operation is associated to said output product according to the attributes of said output product.

12. A computer program product of claim 10, wherein in step (c), the attributes of said input product are defined according to:
    attributes of the at least one sub-product, and
    manufacturing features required by the associated manufacturing operation.

13. A computer program product of claim 10, wherein:
    in step (b), a set of manufacturing operations are associated to said output product; and
    in step (c), the attributes of said input product are derived from modification of attributes of the at least one sub-product according to the associated set of manufacturing operations.

14. A computer program product of claim 10, further comprising the steps of:
    (d) receiving a sub-product as a new output product, and (e) defining attributes of a new input product by repeating steps (b) and (c).

15. A computer program product of claim 14, wherein step (d) is repeated until no more manufacturing operation can be associated to a received output product.

16. A computer assisted manufacturing process using the computer implemented method, comprising steps of:
   (i) receiving at least one input product;
   (ii) identifying a manufacturing operation to be carried out on said input product according to attributes of said input product, the attributes of said input product including design specifications and consumable manufacturing features specifications;
   (iii) matching the identified manufacturing operation with a manufacturing shop and routing said at least one input product to said shop;
   (iv) providing an output product by performing the identified manufacturing operation on said at least one input product.

17. The computer assisted manufacturing process of claim 16, wherein manufacturing features required by the identified manufacturing operation are displayed on a user's screen.

18. The computer assisted manufacturing process of claim 17, wherein at least one manufacturing feature required by the identified manufacturing operation is consumed when performing the identified manufacturing operation.

19. The computer assisted manufacturing process of claim 16, wherein a manufacturing feature is created when performing the identified manufacturing operation.

20. The computer assisted manufacturing process of claim 16, wherein the computer assisted manufacturing process is used in a shipyard building site.

* * * * *